United States Patent

Phelps et al.

[11] Patent Number: 5,652,312
[45] Date of Patent: Jul. 29, 1997

[54] REDISTRIBUTION OF ORGANIC POLYESTERCARBONATE COMPOSITIONS

[75] Inventors: Peter David Phelps, Schenectady; Eugene Pauling Boden, Scotia; Patrick Joseph McCloskey, Watervliet; David Michel Dardaris, Ballston Spa, all of N.Y.; Adelbert Hermannus Leonardus Groothuis, Bergen op Zoom, Netherlands

[73] Assignee: General Electric Company, Schenectady, N.Y.

[21] Appl. No.: 373,805

[22] Filed: Jan. 17, 1995

[51] Int. Cl.$^6$ .................. C08F 283/02; C08G 64/00
[52] U.S. Cl. ................ 525/462; 264/176.1; 264/211.24; 525/437; 525/469; 528/176; 528/193; 528/194; 528/196; 528/198; 528/199; 528/201; 528/481; 528/489; 528/490; 528/491; 528/502
[58] Field of Search .................. 264/176.1, 211.24; 528/176, 193, 194, 196, 198, 199, 201, 481, 489, 490, 491, 502; 525/462, 469, 437

[56] References Cited

U.S. PATENT DOCUMENTS

| 4,558,106 | 12/1985 | Kawakami et al. | 526/216 |
| 4,857,625 | 8/1989 | Clendinning et al. | 528/171 |
| 5,025,081 | 6/1991 | Fontana et al. | 528/176 |
| 5,274,068 | 12/1993 | Boden et al. | 528/176 |
| 5,391,690 | 2/1995 | Kanno et al. | 528/198 |
| 5,414,057 | 5/1995 | Campbell et al. | 525/462 |

FOREIGN PATENT DOCUMENTS 0595608   5/1994   European Pat. Off. .

*Primary Examiner*—Terressa Mosley
*Attorney, Agent, or Firm*—William H. Pittman

[57] ABSTRACT

Polyestercarbonates, particularly those containing aliphatic dicarboxylic acid-derived structural units, are redistributed by heating in the presence of a carbonate redistribution catalyst, and, optionally, a diaryl carbonate. The redistribution products have weight average molecular weights different from, and typically lower than, the initial molecular weight.

18 Claims, No Drawings

REDISTRIBUTION OF ORGANIC POLYESTERCARBONATE COMPOSITIONS

BACKGROUND OF THE INVENTION

The present invention relates to the redistribution of organic polyestercarbonate compositions. The term "redistribution" is defined as the process of reforming an initial polyestercarbonate composition having an initial weight average molecular weight into a redistributed polyestercarbonate composition having a weight average molecular weight which is different from the initial molecular weight.

Polycarbonates are well known high performance engineering thermoplastics characterized by many advantageous physical properties, such as high optical clarity, toughness, dimensional stability and excellent impact strength over a wide temperature range.

A property of polycarbonates which is not always desirable is their high melt viscosity and low melt flow. Melt flow may be increased by incorporating aliphatic ester units in the polycarbonate; i.e., by preparing a polyestercarbonate. This is typically achieved by incorporating in the conventional polycarbonate-forming reaction mixture at least one aliphatic dicarboxylic acid, typically containing about 4–20 carbon atoms, which forms ester units with the dihydroxyaromatic compound employed as a polycarbonate precursor. Polyestercarbonates of this type are disclosed in U.S. Pat. Nos. 5,025,081 and 5,274,068, the disclosures of which are incorporated by reference herein. Other polyestercarbonates prepared similarly from aromatic dicarboxylic acid derivatives such as terephthaloyl chloride are also known.

European patent application 585,608 and copending, commonly owned application Ser. No. 08/159,691, now U.S. Pat. No. 5,414,057 disclose and claim a method for redistribution of polycarbonates by heating with a polycarbonate redistribution catalyst. The result is formation of a polycarbonate having a different molecular weight from the starting material.

On first consideration, the redistribution process appears similar to melt polycarbonate synthesis, in which a dihydroxyaromatic compound is heated with a diaryl carbonate such as diphenyl carbonate in the presence of a catalyst. Such similarity would make polyestercarbonate redistribution difficult or impossible to attain, at least in certain instances. For example, melt synthesis of polyestercarbonates from reaction mixtures containing adipic acid is problematic because the adipic acid undergoes self-condensation leading to chain termination.

A further possible problem with polyestercarbonate preparation by redistribution is attributable to the chemical nature of the reaction. Redistribution is similar to hydrolysis, and in fact is often achieved at least in part by hydrolysis of the polymer by water (e.g., water of hydration) present in the catalyst. Such reactions are not detrimental if limited to the carbonate units, which are generally present in predominant amount by a wide margin. However, hydrolysis or the like of the ester units, present in much lesser amounts, is extremely undesirable since it can vitiate the melt viscosity and melt flow advantages for which the polyestercarbonate is employed.

The present invention is based on the discovery that, despite the difficulty of conducting melt polyestercarbonate formation reactions with certain dicarboxylic acids, redistribution of polyestercarbonates takes place readily and without substantial hydrolysis or other degradation of the ester units. It is thus possible to interconvert polyestercarbonates of various molecular weights, and more particularly to prepare a single grade by interfacial or melt polymerization methods and to convert that grade into polyestercarbonates of other molecular weights by redistribution.

SUMMARY OF THE INVENTION

The invention is a method for the redistribution of an organic polyestercarbonate composition. As noted hereinbefore, the term "redistribution" refers to a process of reforming an initial polyestercarbonate composition having an initial weight average molecular weight into a redistributed polyestercarbonate composition having a different molecular weight. The method comprises melt equilibrating an initial organic polyestercarbonate composition having a major proportion of carbonate structural units and a minor proportion of structural units derived from at least one dihydroxyaromatic compound and at least one dicarboxylic acid in the presence of a catalytic amount of a carbonate redistribution catalyst under reaction conditions such that a redistributed organic polyestercarbonate composition is formed. The method of this invention is conducted in the absence of branching agents, identified hereinafter.

DETAILED DESCRIPTION; PREFERRED EMBODIMENTS

Advantageously, the method of this invention is practical and therefore suitable for industrial manufacturing plants. Specifically, the method of this invention allows for the plant production of a single grade of interfacially prepared organic polyestercarbonate. This single grade of polymer may then be reformed before leaving the plant via the method of this invention into various commercial grade polyestercarbonates. The method of this invention eliminates inventories of interfacially prepared transition grade polyestercarbonates. Moreover, the method eliminates the need to match and blend transition grades of polyestercarbonates to produce a commercial product. Problems arising from inconsistencies between transition grade polyestercarbonates are also eliminated.

Even more advantageously, the method of this invention can be controlled to produce a polyestercarbonate composition of any selected molecular weight within the known range for such polymers. In addition, the redistributed polyestercarbonate composition exhibits improved melt stability when compared with the interfacially prepared initial polyestercarbonate composition.

Any organic polyestercarbonate composition may be employed in the redistribution method of this invention. Most often, the polyestercarbonate contains aromatic carbonate structural units in combination with units derived from an ester of an aliphatic or aromatic dicarboxylic acid, typically having about 4–20 carbon atoms, with the dihydroxyaromatic compound polycarbonate precursor. Illustrative acids are adipic acid, suberic acid, azelaic acid, 1,12-dodecanedicarboxylic acid and terephthalic acid. The aliphatic dicarboxylic acids, and especially adipic and 1,12-dodecanedicarboxylic acids, are preferred.

Typically, the weight average molecular weight of the polyestercarbonate starting composition may range from values as low as 5,000 to values as high as 200,000, as measured by gel permeation chromatography using polystyrene as the reference material. Preferably, the weight average molecular weight of the polyestercarbonate starting composition ranges from about 20,000 to about 100,000, more preferably, from about 35,000 to about 65,000.

Examples of dihydroxyaromatic compounds suitable for the preparation of linear aromatic polyestercarbonates useful as starting materials for the method of this invention are disclosed in U.S. Pat. No. 4,727,134, relevant portions of the disclosure of which are incorporated herein by reference. Dihydroxyaromatic compounds disclosed therein include bisphenol A, as well as bis(4-hydroxyphenyl)methane, 1,1-bis(4-hydroxyphenyl)cyclohexane, bis(4-hydroxyphenyl) diphenylmethane, 4,4'-dihydroxybiphenyl, 2,6-dihydroxynaphthalene, resorcinol, and 2,2-bis(3,5-dichloro-4-hydroxyphenyl)propane. Dihydroxyaromatic compounds of the bisphenol A type, and especially bisphenol A, are preferred for their particular suitability in preparing linear aromatic polyestercarbonate compositions useful for the method of this invention. Mixtures of dihydroxyaromatic compounds may also be employed.

The chain length of the polyestercarbonate product and thus the desired molecular weight can be adjusted and regulated by adding a chain terminating agent or chain stopper to the reaction mixture. Suitable chain stoppers include monofunctional phenols, such as, unsubstituted phenol, m- and p-methylphenol, m- and p-ethylphenol, m- and p-propylphenol, m- and p-isopropylphenol, m-bromophenol, p-butylphenol, p-t-butylphenol and p-cumylphenol. The addition of this agent is usually made prior to the addition of the carbonate precursor, but can be made at any time up to the point of reaction wherein the degree of polymerization approaches that of a high polymer.

The quantity of chain terminating agent which can be added to prepare the polyestercarbonate is an amount effective to prepare substrates having a weight average molecular weight in the range preferably from about 5,000 to about 100,000. This amount will vary as a function of the mole percent of dihydroxyaromatic compound and the identity and proportion of dicarboxylic acid employed in the reaction.

In accordance with the method of this invention, any of the above-identified polyestercarbonates having an initial weight average molecular weight typically in the range from about 5,000 to about 100,000 may be reformed into a final polyestercarbonate composition having a different molecular weight. Included are branched polyestercarbonates, mixtures of different linear or branched polyestercarbonates and mixtures of linear and branched polyestercarbonates. The process is also useful with recycled polyestercarbonates.

The redistribution process involves melt equilibrating the starting composition in the presence of a carbonate redistribution catalyst. Melt equilibration involves heating the polymer at a temperature sufficient to produce a melt for a time sufficient to achieve the desired molecular weight. Typically, when the starting material is a single homopolymer or copolymer, redistribution converts the starting polyestercarbonate into a redistributed polyestercarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

The redistribution method of this invention is not intended to incorporate into the starting materials branching agents such as phenolic compounds having two or more hydroxy groups per molecule, for example 1,1,1-tris(4-hydroxyphenyl)ethane. Branching agents of this type will be recognized by those skilled in the art of polycarbonate synthesis and are described in U.S. Pat. Nos. 5,021,521 and 5,097,008.

Suitable carbonate redistribution catalysts include a wide variety of bases and Lewis acids. Illustrative examples include, amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, and tetraethylammonium hydroxide; tetraalkylammonium phenoxides, such as tetramethylammonium phenoxide, usually as the monohydrate; tetraalkylammonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; as well as organotitanium compounds, such as titanium tetra(isopropoxide), titanium tetra(5-methylheptoxide), and titanium tetra(butoxide); as well as, zirconium tetra(isopropoxide), aluminum tri(ethoxide), aluminum tri(phenoxide), mercuric acetate, lead acetate, (diphenyl)mercury, (tetraphenyl)lead, and (tetraphenyl)silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide. Preferably, the catalyst is a tetraalkylammonium base, such as a tetraalkylammonium hydroxide, acetate, or phenoxide. More preferably, the catalyst is a tetraalkylammonium hydroxide, wherein each alkyl moiety contains from 1 to about 16 carbon atoms, more preferably, from 1 to about 10 carbon atoms, and most preferably, from 1 to about 4 carbon atoms.

The amount of carbonate redistribution catalyst employed in the method of this invention may be any amount which is effective in promoting the redistribution process. Usually the effective amount will depend upon the particular catalyst employed, the reaction rate desired, the particular molecular weight desired in the redistributed composition, and to a lesser extent on the chemical nature of the particular starting polyestercarbonate composition. Depending upon such variables, an effective amount of catalyst can easily be determined without undue experimentation. It is preferred that when the catalyst is a tetraalkylammonium hydroxide, the amount of catalyst ranges from about 15 ppm to about 1000 ppm based upon the amount of starting polyestercarbonate. More preferably, the amount of such catalyst ranges from about 30 ppm to about 180 ppm.

Optionally, a diaryl carbonate may be added to the starting polyestercarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate employed in the method of this invention may be any amount which provides the desired molecular weight in the redistributed polyestercarbonate composition. Usually, the amount of diaryl carbonate is up to about 1.5% by weight based upon the amount of starting polyestercarbonate, more preferably no greater than about 1.0%.

The redistribution method of this invention can be effected by dry mixing the starting organic polyestercarbonate, the carbonate redistribution catalyst, and optionally, the diaryl carbonate, and melt equilibrating the resulting mixture at a temperature ranging from about 180° C. to about 320° C. Preferably, the temperature ranges from about 250° C. to about 300° C. Typical melt processing techniques include melt condensation in a Helicone reactor for approximately 5 to 30 minutes, or continuous extrusion using a single screw or twin screw extruder. One skilled in the art will recognize that if extrusion is employed, the screw speed and feed rate may vary. During heating, it may be necessary to vent gases formed during decomposition of the carbonate redistribution catalyst.

Generally, the redistribution process of this invention is allowed to proceed to its thermodynamic endpoint. This is usually determined by tracking the dispersivity, which is defined as the ratio of weight average molecular weight to number average molecular weight, with respect to time. Typically, the dispersivity decreases as the redistribution process progresses until at the apparent thermodynamic endpoint the dispersivity levels off.

One advantage of the method of this invention that the molecular weight of the redistributed polyestercarbonate composition may be controlled to a fine degree. Control is generally obtained simply by varying the amounts of carbonate redistribution catalyst and diaryl carbonate employed in the redistribution process.

In such a manner, it is possible to obtain from a single interfacially prepared polyestercarbonate composition a variety of lower molecular weight redistributed compositions heretofore available only by interfacial polymerization methods. Thus, the redistribution of commercial grades of linear aromatic polyestercarbonate via the method of this invention yields a variety of lower molecular weight polyestercarbonates currently available only by interfacial polymerization methods.

It is also possible to redistribute a mixture of high and low molecular weight polyestercarbonates to obtain a polyestercarbonate of intermediate molecular weight. The latter generally have narrower molecular weight distributions, as represented by dispersivity (Mw/Mn), and lower melt viscosities than simple blends of the high and low molecular weight resins. Mixtures of linear and branched resins may also be redistributed. Finally, recycled polyestercarbonates may be redistributed individually or in admixture; the products have the high ductility of the non-redistributed simple blends as well as other desirable properties.

Another advantage of the redistribution method of this invention is that the redistributed polyestercarbonate compositions exhibit improved melt stability when compared with the interfacially prepared starting polyestercarbonates. Melt stability can be ascertained by measuring the difference in the molecular weight of a polymer before and after heating in a Tinius Olsen Extrusion Plastometer. More stable compositions will exhibit less change in molecular weight.

A still further advantage, mentioned hereinabove, is that the redistribution process substantially affects only carbonate structural units. Thus, the ester units whose presence, albeit usually in minor proportion, is essential for the desired melt viscosity/flow properties remain substantially undegraded.

Redistributed polyestercarbonate compositions may be further improved when compared with interfacially prepared compositions in that the redistributed compositions often show lower concentrations of total polyestercarbonate lows.

The following examples are illustrative of the method of this invention. Molecular weights were determined by gel permeation chromatography relative to polystyrene. The polyestercarbonates employed were bisphenol A polyestercarbonates incorporating 9% by weight adipic acid (AA) or 1,12-dodecanedioic acid (DDDA) units and having weight average molecular weights in the range of about 55.000–60,000.

EXAMPLES 1–8

Samples of 1 kg. of polyestercarbonate and various proportions of tetraethylammonium acetate (TEAA) and (in Examples 4 and 8) diphenyl carbonate (DPC) were prepared by dry blending in a Henschel mixer. The blends were extruded on a twin screw extruder with vacuum venting, at temperatures in the range of 180°–260° C. The molecular weights of the redistributed products, and in certain cases their dispersivities and hydroxy end group concentrations, were determined and are listed in the following table, in comparison with two controls in which no TEAA was employed and in which the molecular weights were therefore substantially those of the starting polyestercarbonates.

| Example | Acid units | TEAA, ppm | DPC, wt. % | Mw | Mw/Mn | Hydroxy end group conc., ppm |
| --- | --- | --- | --- | --- | --- | --- |
| Control 1 | AA | — | — | 55,400 | — | — |
| 1 | AA | 100 | — | 50,800 | — | — |
| 2 | AA | 200 | — | 48,400 | — | — |
| 3 | AA | 300 | — | 44,000 | | |
| 4 | AA | 300 | 0.5 | 39,700 | — | — |
| Control 2 | DDDA | — | — | 56,900 | 2.79 | 50 |
| 5 | DDDA | 100 | — | 54,600 | 2.63 | 220 |
| 6 | DDDA | 200 | | 51,000 | 2.48 | 240 |
| 7 | DDDA | 300 | — | 46,800 | 2.45 | 360 |
| 8 | DDDA | 300 | 0.5 | 39,500 | 2.48 | 420 |

It will be seen that polyestercarbonates of various molecular weights may be produced by the method of the invention. Analysis for adipic acid units performed on Control 1 and the product of Example 3 in each case showed that the redistributed product still contained 100% of the original adipic acid units, demonstrating that degradation only of polycarbonate units occurred during redistribution.

What is claimed is:

1. A method for the redistribution of an organic polyestercarbonate composition comprising heating an initial linear or branched organic polyestercarbonate composition having a weight average molecular weight from 500 to 200,000 and having a major proportion of carbonate structural units and a minor proportion of units derived from at least one dihydroxyaromatic compound and at least one aliphatic dicarboxylic acid containing about 4–20 carbon atoms, at a temperature in the range of about 180°–320° C. in a mixture which includes a carbonate redistribution catalyst in the amount of about 15–1000 ppm based on initial polyestercarbonate and in the absence of branching agents, thus forming a redistributed polyestercarbonate composition having a weight average molecular weight which is different from the initial molecular weight.

2. A method according to claim 1 wherein the carbonate structural units in the polyestercarbonate are aromatic.

3. A method according to claim 2 wherein the carbonate structural units are bisphenol A carbonate units.

4. A method according to claim 2 wherein the aliphatic acid is adipic acid.

5. A method according to claim 2 wherein the aliphatic acid is 1,12-dodecanedioic acid.

6. A method according to claim 2 wherein the catalyst is a tetraalkylammonium base.

7. A method according to claim 6 wherein the catalyst is a $C_{1-16}$ tetraalkylammonium hydroxide.

8. A method according to claim 6 wherein the catalyst is a $C_{1-16}$ tetraalkylammonium acetate.

9. A method according to claim 6 wherein the amount of catalyst is about 15–1000 ppm based on polyestercarbonate.

10. A method for the redistribution of an organic polyestercarbonate composition comprising heating an initial linear or branched organic polyestercarbonate composition having a weight average molecular weight from 500 to 200,000 and having a major proportion of carbonate structural units and a minor proportion of units derived from at least one dihydroxyaromatic compound and at least one aliphatic dicarboxylic acid containing about 4–20 carbon atoms, at a temperature in the range of about 180°–320° C. in a mixture which includes a carbonate redistribution catalyst in the amount of about 15–1000 ppm based on initial polyestercarbonate and a diaryl carbonate and in the absence of branching agents, thus forming a redistributed polyestercarbonate composition having a weight average molecular weight which is different from the initial molecular weight.

11. A method according to claim 11 wherein the carbonate structural units are bisphenol A carbonate units.

12. A method according to claim 10 wherein the aliphatic acid is adipic acid.

13. A method according to claim 10 wherein the aliphatic acid is 1,12-dodecanedioic acid.

14. A method according to claim 10 wherein the catalyst is a tetraalkylammonium base.

15. A method according to claim 14 wherein the amount of catalyst is about 15–1000 ppm based on polyestercarbonate.

16. A method according to claim 10 wherein the amount of diaryl carbonate is up to about 1.5% by weight based on polyestercarbonate.

17. A method according to claim 16 wherein the diarylcarbonate is diphenyl carbonate.

18. A method according to claim 1 which is conducted in an extruder.

* * * * *